United States Patent
Naito et al.

(10) Patent No.: US 10,032,563 B2
(45) Date of Patent: Jul. 24, 2018

(54) CAPACITOR ELEMENT

(71) Applicant: SHOWA DENKO K.K., Tokyo (JP)

(72) Inventors: Kazumi Naito, Tokyo (JP); Shouji Yabe, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 286 days.

(21) Appl. No.: 14/409,205

(22) PCT Filed: Apr. 9, 2013

(86) PCT No.: PCT/JP2013/002407
§ 371 (c)(1),
(2) Date: Dec. 18, 2014

(87) PCT Pub. No.: WO2013/190757
PCT Pub. Date: Dec. 27, 2013

(65) Prior Publication Data
US 2015/0194268 A1    Jul. 9, 2015

(30) Foreign Application Priority Data

Jun. 22, 2012 (JP) .................................. 2012-141505

(51) Int. Cl.
*H01G 9/042*    (2006.01)
*H01G 9/04*    (2006.01)
(Continued)

(52) U.S. Cl.
CPC .............. *H01G 9/042* (2013.01); *H01G 9/04* (2013.01); *H01G 9/052* (2013.01); *H01G 9/07* (2013.01); *H01G 9/15* (2013.01); *Y10T 29/417* (2015.01)

(58) Field of Classification Search
CPC .......... H01G 9/042; H01G 9/15; H01G 9/028; H01G 9/012; H01G 9/12; H01G 9/045; H01G 9/038
See application file for complete search history.

(56) References Cited

U.S. PATENT DOCUMENTS 5,563,090 A * 10/1996 Lee .................. H01L 28/84
                                                        257/E21.013
5,621,608 A *  4/1997 Arai ................ H01G 9/025
                                                        29/25.03
(Continued)

FOREIGN PATENT DOCUMENTS

JP    54-16663 A    2/1979
JP    10-79326 A    3/1998
(Continued)

OTHER PUBLICATIONS

Communication dated Jan. 18, 2016, from the European Patent Office in counterpart European Application No. 13806979.0.
(Continued)

*Primary Examiner* — Nguyen Ha
(74) *Attorney, Agent, or Firm* — Sughrue Mion, PLLC (57) ABSTRACT

A capacitor element including at least an anode body composed of a sintered compact containing tungsten as a main component, a dielectric layer with a smooth surface formed by chemical conversion of the surface of the anode body, and a semiconductor layer laminated on the dielectric layer. The capacitor is obtained by a production method which includes the steps of chemically converting the surface layer of the tungsten powder sintered compact into the dielectric layer in an aqueous solution containing 0.05 to 12% by mass of an oxidant composed of an oxygen-containing compound at a solution temperature of 62° C. or less, and removing all or most of water adhering to the inner surface of pores at a temperature of less than the boiling point of water, followed by drying at a temperature of not less than the boiling point of water.

18 Claims, 5 Drawing Sheets

(51) Int. Cl.
*H01G 9/052* (2006.01)
*H01G 9/07* (2006.01)
*H01G 9/15* (2006.01)

(56) References Cited

U.S. PATENT DOCUMENTS

| | | | | |
|---|---|---|---|---|
| 2003/0081374 | A1* | 5/2003 | Takada | H01G 9/0036 |
| | | | | 361/523 |
| 2004/0016978 | A1 | 1/2004 | Yano et al. | |
| 2006/0028787 | A1* | 2/2006 | Yoshida | H01G 9/042 |
| | | | | 361/523 |
| 2007/0128775 | A1* | 6/2007 | Jeon | H01L 21/28088 |
| | | | | 438/149 |
| 2007/0236867 | A1* | 10/2007 | Hossick-Schott | A61N 1/3956 |
| | | | | 361/523 |
| 2008/0297982 | A1 | 12/2008 | Umemoto et al. | |
| 2009/0128995 | A1 | 5/2009 | Nemoto et al. | |
| 2013/0100583 | A1* | 4/2013 | Ito | H01G 9/058 |
| | | | | 361/502 |
| 2013/0277626 | A1* | 10/2013 | Naito | B22F 1/0096 |
| | | | | 252/515 |
| 2014/0233154 | A1* | 8/2014 | Naito | H01G 9/052 |
| | | | | 361/500 |

FOREIGN PATENT DOCUMENTS

| | | |
|---|---|---|
| JP | 2000-12396 A | 1/2000 |
| JP | 2004-349658 A | 12/2004 |
| JP | 2005-191421 A | 7/2005 |
| JP | 2008-300463 A | 12/2008 |

OTHER PUBLICATIONS

International Search Report for PCT/JP2013/002407 dated Jul. 16, 2013 English Translation.

* cited by examiner

Chemical Conconversion treatment
Water Washing - Water Removal - Drying

FIG. 4C

Laminating of Semiconductor layer

Capacitor element

FIG. 4D

Laminating of Conductor layer

Solid Electrolytic Capacitor

CAPACITOR ELEMENT

CROSS REFERENCE TO RELATED APPLICATIONS

This application is a National Stage of International Application No. PCT/JP2013/002407 filed Apr. 9, 2013, claiming priority based on Japanese Patent Application No. 2012-141505 filed Jun. 22, 2012, the contents of all of which are incorporated herein by reference in their entirety.

TECHNICAL FIELD

The present invention relates to a capacitor element. More specifically, the present invention relates to a capacitor element that uses a tungsten anode body, and that has a high capacitance in a high frequency range and less leakage current.

BACKGROUND ART

Known capacitor elements are obtained by subjecting an anode body composed of a sintered compact of tantalum powder or niobium powder to electrolytic oxidation in an aqueous solution of an electrolyte such as phosphoric acid to chemically convert the surface layer of the sintered compact into a dielectric composed of metal oxide. Further, various techniques for improving tantalum capacitor elements have been proposed (Patent Document 2).

Figure 1:
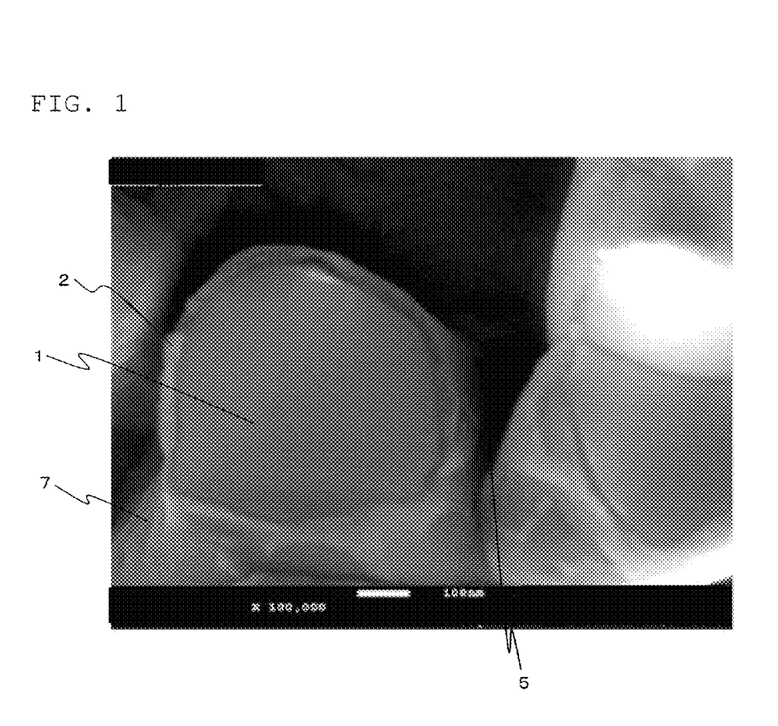
FIG. 1 is a figure showing a scanning electron microscope photograph of the fracture surface of a sintered compact having a dielectric layer on the surface thereof obtained in Example 19.
Figure 2:
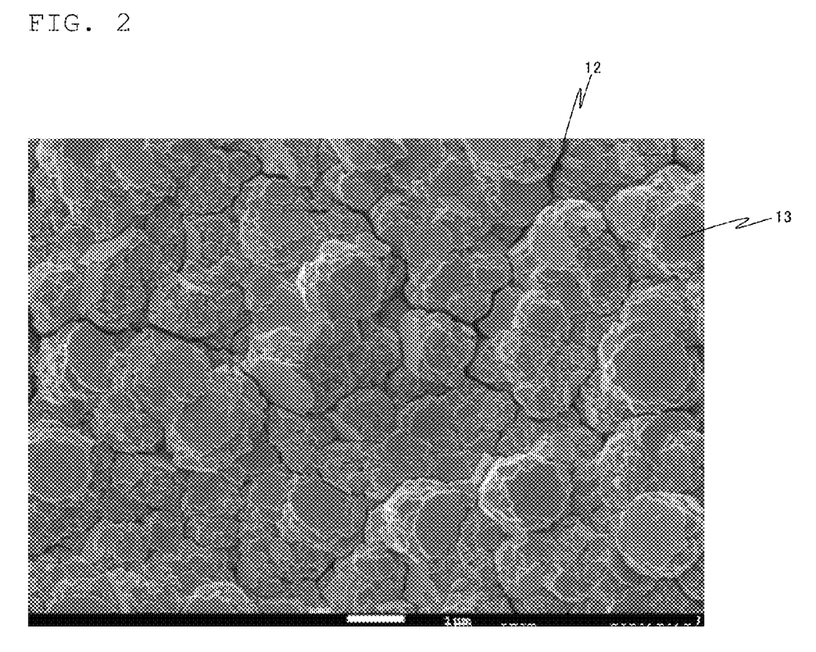
FIG. 2 is a figure showing a scanning electron microscope photograph of the surface of a sintered compact having a dielectric layer on the surface thereof obtained by a conventional method.

Tungsten is known as one of valve action metals. When an anode body composed of a sintered compact of tungsten powder is subjected to electrolytic oxidation under the same conditions as the conditions of electrolytic oxidation of an anode body composed of a sintered compact of tantalum powder or niobium powder, tungsten oxide is crystallized in the formation process of a dielectric layer, thereby producing clods 13 with a flat surface, as shown in FIG. 2. This dielectric layer is not a sufficiently dense film with a suitable thickness, and seems to have many defects that electric current may flow when voltage is applied. Accordingly, conventional tungsten capacitors have large leakage current. Moreover, as shown in FIG. 2, narrow pores 12 make it difficult to uniformly form a semiconductor layer deep in the pores, which may reduce the capacitance. As a result, the obtained tungsten capacitor has a much lower capacitance in a high frequency range than in a low frequency range. Furthermore, in order to reduce leakage current, use of an alloy composed of tungsten and other metal is examined (Patent Document 1); however, the effect of reducing leakage current is slight.

PRIOR ART DOCUMENTS

Patent Documents

Patent Document 1: JP 2004-349658 A
Patent Document 2: JP 2000-012396 A

SUMMARY OF THE INVENTION

Problems to be Solved by the Invention

An object of the present invention is to provide a capacitor element that uses a tungsten anode body and that undergoes less capacitance reduction in a high frequency range.

Means for Solving the Problems

The present inventors conducted extensive studies to achieve the above object. As a result, the invention including the following embodiments has been completed.

[1] A capacitor element comprising
an anode body composed of a tungsten sintered compact;
a dielectric layer with a smooth surface formed by chemical conversion of the surface of the anode body; and
a semiconductor layer laminated on the dielectric layer.

[2] A capacitor element comprising
an anode body composed of a tungsten sintered compact;
a dielectric layer formed by chemical conversion of the surface of the anode body; and
a semiconductor layer laminated on the dielectric layer;
wherein the ratio of 10-kHz capacitance to 120-Hz capacitance is 55% or more.

[3] A method for producing the capacitor element according to [1] or [2], in which the method comprises chemically converting the surface of the sintered compact of a tungsten powder into the dielectric layer in an aqueous solution containing 0.05 to 12% by mass of an oxidant composed of an oxygen-containing compound at a solution temperature of 62° C. or less.

[4] The production method according to [3], wherein the oxidant is at least one selected from the group consisting of manganese(VII) compounds, chromium(VI) compounds, halogen acid compounds, persulfuric acid compounds, and organic peroxides.

[5] The production method according to [3] or [4], further comprising, after the chemical conversion, removing water adhering to the surface of the sintered compact at a temperature of less than the boiling point of water, followed by drying at a temperature of not less than the boiling point of water.

[6] The production method according to [3] or [4], further comprising, after the chemical conversion, removing water permeating into pores of the sintered compact at a temperature of less than the boiling point of water, followed by drying at a temperature of not less than the boiling point of water.

[7] The production method according to [5] or [6], wherein the water removal is performed by contact with a solvent that is miscible with water.

[8] The production method according to [7], wherein the solvent miscible with water is at least one selected from acetic acid, acetone, acetonitrile, dimethylformamide, dimethylsulfoxide, dioxane, propanol, ethanol, methanol, and tetrahydrofuran.

[9] The production method according to any one of [5] to [8], wherein the drying is performed first at a temperature of not less than 105° C. and less than 160° C., and then at a temperature of not less than 160° C. and not more than 230° C.

[10] A solid electrolytic capacitor comprising the capacitor element according to [1] or [2].

Advantageous Effects of the Invention

According to the production method of the present invention, a solid electrolytic capacitor element having a dielectric layer with a smooth surface composed of tungsten oxide can be produced. The capacitor element or capacitor of the present invention has a high capacitance in a high frequency range and less leakage current.

Although the reason why such an effect is obtained is not clear, the reason is considered as follows. That is, in the present invention, since the dielectric layer composed of tungsten oxide has a smooth surface, a monomer for conductive polymer, which is a raw material of a semiconductor layer, enters deep into pores of the anode body so that the pores are filled with a uniform conductive polymer, consequently realizing a high capacitance in a high frequency range and less leakage current.

Chemical conversion treatment of a sintered compact of tantalum powder, niobium powder, or aluminum powder in a chemical conversion liquid containing an oxidant (Patent Document 2) does not result in a phenomena in which the capacitance in a high frequency range is higher than that obtained by chemical conversion treatment in a chemical conversion liquid containing an electrolyte, such as phosphoric acid. Therefore, the effect of the present invention is so unique that it is obtained only when tungsten is used.

BRIEF DESCRIPTION OF THE DRAWINGS

FIGS. 4A to 4D show the steps for producing a capacitor element and a solid electrolytic capacitor in accordance with the invention.

EMBODIMENTS FOR CARRYING OUT THE INVENTION

The capacitor element according to one embodiment of the present invention comprises an anode body composed of a tungsten sintered compact; a dielectric layer formed by chemical conversion of the surface of the anode body; and a semiconductor layer laminated on the dielectric layer.

A suitable form of the anode body is such that one granular material and another granular material are intersected and connected in a beaded state. The granular materials are derived from a tungsten powder, as described later. The conductivity between the granular materials is ensured because the granular materials are intersected and connected to one another. There are pores among the granular materials connected in a beaded state.

The anode body is preferably a sintered compact of tungsten powder. The tungsten powder used in the present invention may be a powder of tungsten metal simple or a powder of tungsten alloy. Tungsten used in the anode body is not particularly limited, and may be a commercial product. Solid tungsten metal is commercially available in the form of powders, blocks, bars, and the like. Further, tungsten produced in the following manner can be used in the anode body. For example, a tungsten powder having a desired particle size can be obtained by crushing a tungsten trioxide powder in a hydrogen flow. Moreover, a tungsten powder having a desired particle size can be obtained by reducing tungstic acid or tungsten halide using a reducing agent such as hydrogen or sodium. Furthermore, a tungsten powder can be obtained from tungsten-containing mineral through known processes. The tungsten used in the present invention has an oxygen content of preferably 0.05 to 8% by mass, and more preferably 0.08 to 1% by mass. Examples of tungsten alloys include alloys of tungsten and metals such as tantalum, niobium, aluminum, titanium, vanadium, zinc, molybdenum, hafnium, zirconium, and bismuth.

At least part of the surface of the tungsten may be silicified, boronized, and/or carbonized, or the tungsten may be a mixture containing at least one of these forms of tungsten. Moreover, at least part of the surface of tungsten and a tungsten mixture may contain nitrogen.

Silicified tungsten can be obtained, for example, by mixing a tungsten powder with a silicon powder, and reacting the mixture by heating under reduced pressure. This method results in the formation of tungsten silicide, such as $W_5Si_3$ and the like, in which the tungsten silicide is locally present in the surface layer within usually 50 nm from the tungsten particle surface.

Nitrogen-containing tungsten can be obtained, for example, by placing a tungsten powder under reduced pressure at 350 to 1,500° C., and flowing nitrogen gas for several minutes to several hours. The treatment for incorporating nitrogen may be performed during high-temperature treatment for silicifying the tungsten powder, or silicification may be performed after the treatment for incorporating nitrogen.

Carbonized tungsten can be obtained, for example, by placing a tungsten powder in a carbon electrode furnace under reduced pressure at 300 to 1,500° C. for several minutes to several hours. When nitrogen is flown in the carbon electrode furnace under predetermined conditions, nitrogen absorption occurs simultaneously with carbonization, and a tungsten powder in which part of the surface contains nitrogen and is carbonized can be obtained.

Boronized tungsten can be obtained, for example, by mixing a tungsten powder with a boron source, such as boron simple or a boron element-containing compound, and reacting the mixture by heating under reduced pressure.

Phosphorus-containing tungsten can be obtained, for example, by mixing a tungsten powder with a phosphorus source, such as phosphorus simple or a phosphorus element-containing compound, and reacting the mixture by heating under reduced pressure.

The tungsten powder has an average primary particle size of preferably 0.1 to 1 μm, more preferably 0.1 to 0.7 μm, and even more preferably 0.1 to 0.3 μm. The tungsten powder may be a granulated powder. The granulated powder can be produced, for example, by sintering and grinding a non-granulated tungsten powder, etc. Alternatively, the granulated powder can be produced by sintering and grinding again the once-produced granulated powder. The granulated powder has a 50% particle size of preferably 20 to 170 μm, and more preferably 26 to 140 μm.

The anode body may contain a metal other than tungsten within a range that does not adversely affect the capacitor characteristics. Examples of the other metal include valve action metals, such as tantalum, niobium, aluminum, titanium, vanadium, zinc, molybdenum, hafnium, zirconium, and the like. The amount of metal other than tungsten contained in the anode body is preferably 20% by mass or less, and more preferably 10% by mass or less.

The sintered compact can be obtained by compressing a raw material powder comprising a tungsten powder and optionally another metal powder to obtain a compression body, and firing the compression body in a furnace. A binder may be mixed with the raw material powder to facilitate pressure forming. Various conditions, including the powder amount and the forming equipment, can be suitably determined so as to achieve the desired compact density, etc. There is a method in which an anode lead wire, which is used as the terminal of an anode body, is implanted by burying it in the compression body when the raw material powder is compressed. The anode lead wire may be a metal wire, such as tungsten, tantalum, or niobium. There is another method in which an anode lead wire is connected by welding to the sintered compact afterward. In place of a metal wire, a metal plate or metal foil may be implanted or connected to the sintered compact.

The temperature of firing is preferably 1,300 to 1,700° C., and more preferably 1,400 to 1,600° C. The firing time is preferably 10 to 50 minutes, and more preferably 15 to 30 minutes. When firing is performed at too high temperature or for too long period of time, spaces (pores) among raw material particles decrease, and a dense sintered compact with a low pore volume tends to be obtained. When firing is performed at too low temperature or for too short period of time, the resulting sintered compact has insufficient strength, which may cause disintegration of the sintered compact. Although the atmosphere during firing is not particularly limited, reduced pressure atmosphere is preferred. When firing is performed, the above-mentioned silicification, boronization, or carbonization and/or treatment for incorporating nitrogen or phosphorus can also be performed.

A dielectric layer is obtained by chemical conversion of the anode body. Chemical conversion treatment is performed under the following conditions.

In the chemical conversion treatment, an aqueous solution containing an oxidant is used as a chemical conversion liquid. The oxidant used in the present invention is an oxygen-containing compound that is liable to be reduced. A preferred example of the oxidant is at least one selected from the group consisting of manganese(VII) compounds, chromium(VI) compounds, halogen acid compounds, persulfuric acid compounds, and organic peroxides. Specific examples thereof include manganese(VII) compounds such as permanganate; chromium(VI) compounds such as chromium trioxide, chromate, and dichromate; halogen acid compounds such as perchloric acid, chlorous acid, hypochlorous acid, and salts thereof; organic peracids such as peracetic acid, perbenzoic acid, and salts and derivatives thereof; persulfuric acid compounds such as persulfuric acid and salts thereof. Among these, persulfuric acid compounds, such as ammonium persulfate, potassium persulfate, and hydrogen persulfate potassium, are preferred, in terms of the ease of handling, stability and water-solubility of oxidant, and capacitance increase properties. These oxidants can be used alone or in combination of two or more.

The amount of oxidant contained in the chemical conversion liquid is preferably 0.05 to 12% by mass, more preferably 0.05 to 7% by mass, and even more preferably 1 to 5% by mass. When the oxidant content is too low, the resulting effect may be low. When the oxidant content is too high, some capacitor elements may not have high capacitance, and it takes longtime to wash off the chemical conversion liquid after chemical conversion treatment. The temperature of the chemical conversion liquid is 62° C. or less, preferably 0 to 60° C., and more preferably 45 to 60° C. The chemical conversion liquid may contain a known electrolyte within a range that does not impair the effect of the present invention. Examples of electrolytes include acids such as nitric acid, sulfuric acid, boric acid, oxalic acid, adipic acid, phosphoric acid and the like; or alkali metal salts and ammonium salts of these acids. When the amount of electrolyte contained in the chemical conversion liquid is too large, projections and salient striae may be formed on the surface of the dielectric layer, which may impair the smoothness of the dielectric layer.

Chemical conversion treatment using a chemical conversion liquid containing an oxidant may be repeated multiple times. Moreover, chemical conversion treatment using a chemical conversion liquid containing an electrolyte may be performed, if necessary, before or after the chemical conversion treatment using a chemical conversion liquid containing an oxidant. However, in the technique employing chemical conversion treatment using a chemical conversion liquid containing an oxidant and chemical conversion treatment using a chemical conversion liquid containing an electrolyte in combination, the chemical conversion liquids are mixed with each other, which may cause deterioration of each chemical conversion liquid. In order to prevent the deterioration of the chemical conversion liquids, it may take longer time for water washing after chemical conversion treatment.

Next, the sintered compact is immersed in the chemical conversion liquid, and voltage is applied. Voltage is applied between the sintered compact (positive electrode) and the counter electrode (negative electrode). Electricity can be applied to the sintered compact through an anode lead wire.

It is preferable that the voltage application is started at a predetermined initial current density, and this current density value is maintained; and that when the voltage reaches a predetermined value (chemical conversion voltage), this voltage value is maintained. The chemical conversion voltage can be suitably determined depending on the desired withstand voltage.

Although the voltage application time can be suitably determined depending on the size of the sintered compact and the initial current density, it is preferably 3 to 11 hours, more preferably 5 to 10 hours, and even more preferably 5 to 7 hours.

The chemical conversion treatment causes oxidization of tungsten in the surface of the sintered compact, thereby forming a dielectric layer containing tungsten oxide.

The dielectric layer can be controlled to have a desired thickness by adjusting the chemical conversion voltage. For example, under the conditions of 10-V chemical conversion, the thickness of the dielectric layer is preferably 20 to 70 nm, and more preferably 25 to 55 nm.

After the chemical conversion treatment, the sintered compact is washed with pure water. The chemical conversion liquid is removed as much as possible by the water washing. After the water washing, it is preferable to remove water adhering to the surface of the sintered compact or water permeating into the pores of the sintered compact at a temperature of less than the boiling point of water under the pressure of drying. Removal of water is performed, for example, by bringing the sintered compact into contact with a solvent that is miscible with water.

A preferred example of the solvent miscible with water is at least one selected from the group consisting of acetic acid, acetone, acetonitrile, dimethylformamide, dimethylsulfoxide, dioxane, propanol, ethanol, methanol, and tetrahydrofuran. When water is removed before drying at a temperature of not less than the boiling point of water, as described later, the degradation of the dielectric layer is suppressed, and the capacitance in a high frequency range is easily maintained.

After the water removal, it is preferable to perform high temperature drying. Drying is performed at a temperature of not less than the boiling point of water under the pressure of drying, and preferably not less than 160° C. The upper limit of temperature during drying is preferably 250° C. It is more preferable to perform drying first at a temperature of not less than 105° C. and less than 160° C., and then at a temperature of not less than 160° C. and not more than 230° C. When drying is performed at such a temperature, the capacitances in low frequency range and high frequency range increase by around 10 to 15%. When the temperature of drying is too low, the effect of increasing the capacitance in a high frequency range may not be sometimes obtained, causing variation in the capacitance between elements. When the temperature of drying is too high, leakage current may increase, and dielectric loss tangent may increase.

The time of drying is not particularly limited within a range that can maintain the stability of the dielectric layer. The time is preferably 10 minutes to 2 hours, and more preferably 20 minutes to 60 minutes. Chemical conversion treatment may be performed again after drying. The second chemical conversion treatment can be performed under the same conditions as those of the first chemical conversion treatment. After the second chemical conversion treatment, pure water washing, water removal, and drying can be performed in the same manner as above.

When chemical conversion treatment is performed in the above manner, the surface layer of the anode body is oxidized and chemically converted into a dielectric. In the capacitor element according to one embodiment of the present invention, the dielectric layer has a smooth surface 7. The term "smooth" used herein indicates that no sharp projections, salient striae, nor cracks are observed on the surface of the dielectric layer magnified by hundred thousand times in a scanning electron microscope. When the surface of the dielectric layer is smooth, a semiconductor layer, described later, is easily formed uniformly deep in the pores of the anode body. Moreover, in the capacitor according to one embodiment of the present invention, the ratio of 10-kHz capacitance to 120-Hz capacitance is preferably 55% or more, more preferably 70% or more, and even more preferably 75% or more. Because capacitor elements using conventional tungsten anode bodies have a very low capacitance in a high frequency range (see Comparative Examples), the ratio of 10-kHz capacitance to 120-Hz capacitance in the capacitor element of the present invention is unpredictable result from conventional techniques in tungsten capacitors.

A cathode is formed in the member obtained by the above method. Any cathode that is used in conventional electrolytic capacitors can be used without limitation. The cathode is, for example, an inorganic or organic semiconductor layer. Examples of inorganic semiconductor layers include manganese dioxide layers, etc. Examples of organic semiconductor layers include a layer composed of polypyrrole or a derivative thereof, a layer composed of polythiophene or a derivative thereof (e.g., a polymer of 3,4-ethylenedioxythiophene), a layer composed of polyaniline or a derivative thereof, and the other conductive polymer layers. Further, a conductor layer, such as a carbon paste layer, silver paste layer, or metal plating layer, may be formed on the organic or inorganic semiconductor layer.

A cathode lead is electrically connected to the cathode, and part of the cathode lead is exposed to the outside of the exterior of the electrolytic capacitor to be served as a cathode external terminal. On the other hand, an anode lead is electrically connected to the anode body via the anode lead wire, and part of the anode lead is exposed to the outside of the exterior of the electrolytic capacitor to be served as an anode external terminal. A normal lead frame can be used to attach the cathode lead and the anode lead. Then, the exterior is formed by sealing with resin, etc., thereby obtaining a capacitor. The thus-produced capacitor may be subjected to aging treatment, as required. The capacitor of the present invention can be used by mounting it in various electric circuits or electronic circuits.

EXAMPLES

The present invention is explained in more detail below with reference to Examples. Note that they are merely examples for explanation, and the present invention is not limited thereto.

Example 1

Production of Sintered Compact

A tungsten powder having a 50% particle size (D50) of 0.56 μm was mixed with 0.5% by mass of silicon powder having a 50% particle size (D50) of 1 μm, and the mixture was then allowed to stand for 30 minutes at 1,450° C. under vacuum. The mixture was returned to room temperature, and the block object was crushed by a hammer mill, thereby producing a granulated powder having a 50% particle size (D50) of 110 μm (range of particle size distribution: 26 μm-146 μm). Part of silicon was reacted with tungsten, and an alloy of tungsten silicide was present in the tungsten surface layer.

Compression bodies were produced from the granulated powder. When forming, tungsten wires (lead wires) having a diameter Φ of 0.29 mm were implanted. The compression bodies were put in a vacuum firing furnace, and fired at 1,500° C. for 20 minutes, thereby producing 10,000 sintered compacts with a size of 1.0 mm×1.5 mm×4.5 mm (each lead wire was implanted in the 1.0 mm×1.5 mm surface). The mass of each sintered compact except for the lead wire was 61 mg.

[Formation of Dielectric Layer]
i) Chemical Conversion Treatment

As a chemical conversion liquid, 0.05% by mass peracetic acid aqueous solution was prepared. The chemical conversion liquid was placed in a stainless steel container. The lead wire in the sintered compact was inserted into the gang socket part of the jig disclosed in Example 1 of WO2010/107011. The sintered compact was immersed in the chemical conversion liquid to a predetermined position. The lead wire was electrically connected to the positive pole of a power supply, and the container was electrically connected to the negative pole of the power supply. Voltage application was started at a chemical conversion liquid temperature of 10±3° C. at an initial current density of 2 mA per sintered compact, and this current density value was maintained. When the voltage reached 10 V, the 10-V voltage was maintained for 6 hours.

ii) Water Washing—Water Removal—Drying

Subsequently, the sintered compact was washed with pure water to remove the chemical conversion liquid in pores of the sintered compact. The sintered compact was then immersed in ethanol and the ethanol was stirred to thereby remove most of water adhering to the surface (including the inner surface of the pores) of the sintered compact. The sintered compact was pulled out of the ethanol, and dried at 105° C. for 10 minutes, and further at 165° C. for 30 minutes. The surface layer of the sintered compact was chemically converted into a bluish-black dielectric.

The dielectric layer was observed with a scanning electron microscope (JSM-7500FA, produced by JEOL Ltd.). The anode body had a shape in which one granular material and another granular material were intersected and connected in a beaded state. There were spaces (pores) among the granular materials, and a sufficiently dense dielectric layer with a suitable thickness was formed on the anode body. The thickness of the dielectric layers fell within the range of approximately 30 to 50 nm. The surface of the dielectric layer was smooth, without sharp projections, salient striae, or cracks.

[Laminating of Semiconductor Layer]

i) Immersion Step

The sintered compact formed with a dielectric layer was immersed in a 10% by mass ethylenedioxythiophene (hereinafter abbreviated as EDTH) ethanol solution, pulled out of the solution, and dried at room temperature. Then, the sintered compact was immersed in a 10% by mass iron toluenesulfonate aqueous solution, pulled out of the solution, and reacted at 60° C. for 10 minutes. This series of operations was repeated 3 times to obtain a treated product.

ii) Electrolytic Polymerization Step

The treated product was immersed in a 20% by mass EDTH ethanol solution, and pulled out of the ethanol solution. Subsequently, the treated product was immersed in a polymerization solution at a solution temperature of 20° C. stored in a stainless steel (SUS303) container to a predetermined position, and electrolytic polymerization was performed at 70 μA for 55 minutes. The polymerization solution was prepared by dissolving 0.4% by mass of EDTH and 0.6% by mass of anthraquinone sulfonic acid in a solvent comprising 70 parts by mass of water and 30 parts by mass of ethylene glycol. After electrolytic polymerization, the treated product was pulled out of the polymerization solution, washed with pure water, washed with ethanol, and then dried. A semiconductor layer comprising a conductive polymer was laminated on the surface of the dielectric layer.

iii) Second Chemical Conversion Step

As a chemical conversion liquid, 0.05% by mass peracetic acid aqueous solution was prepared. The treated product formed with a semiconductor layer was immersed in the chemical conversion liquid. Voltage application was started at a chemical conversion liquid temperature of 20° C. at an initial current density of 0.5 mA per treated product, and this current density value was maintained. When the voltage reached 6.5 V, the 6.5-V voltage was maintained, and voltage application was performed for 15 minutes. The treated product was pulled out of the chemical conversion liquid, washed with pure water, washed with ethanol, and then dried.

Thereafter, the above series of the immersion step, electrolytic polymerization step, and second chemical conversion step was further repeated 6 times (7 times in total).

[Laminating of Conductor Layer]

On a predetermined portion of the treated product formed with a semiconductor layer, carbon paste was applied and dried, thereby forming a carbon paste layer. On the carbon paste layer, silver paste was applied and dried, thereby forming a silver paste layer. Thus, 128 solid electrolytic capacitor elements were produced.

The 120-Hz capacitance, 10-kHz capacitance, and leakage current of 100 solid electrolytic capacitor elements selected from the produced elements were measured, and their average values were calculated. Tables 1 and 2 show the results.

(Capacitance)

Conductor wires connected to an LCR meter produced by Agilent Technologies were brought into contact with the conductor layer of the capacitor element and the lead wire implanted in the capacitor element. The 120 Hz capacitance and 10 kHz capacitance were measured at a bias voltage of 2.5 V by the LCR meter.

(Leakage Current)

Voltage of 2.5 V was applied to the capacitor element at room temperature. When 30 seconds passed from the start of voltage application, the electric current value (leakage current) of a circuit from the plus terminal of a power supply across the lead wire of the capacitor element, the conductor layer of the capacitor element, and the minus terminal of the power supply was measured.

(50% Particle Size)

The 50% particle size (D50) in the volume-based accumulated particle size distribution was determined based on the particle size distribution measured by a laser diffraction scattering method using a Microtrac HRA 9320-X100.

Examples 2 to 8, and Comparative Example 1

Figure 3:
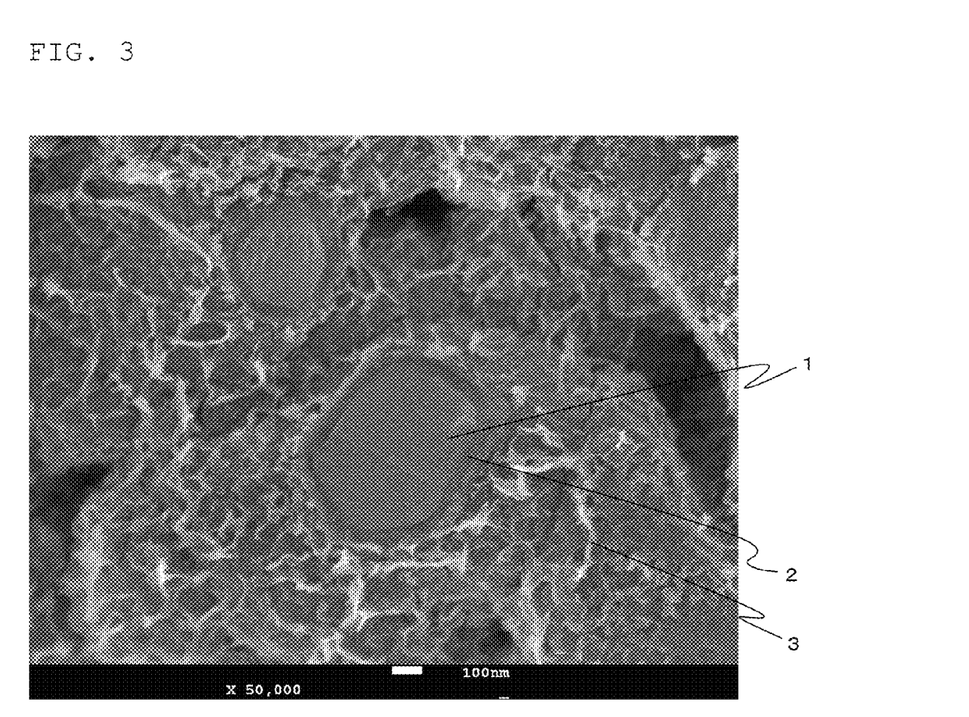
FIG. 3 is a figure showing a scanning electron microscope photograph of the fracture surface of a sintered compact having a dielectric layer on the surface thereof obtained in Comparative Example 7.
Figure 4A:
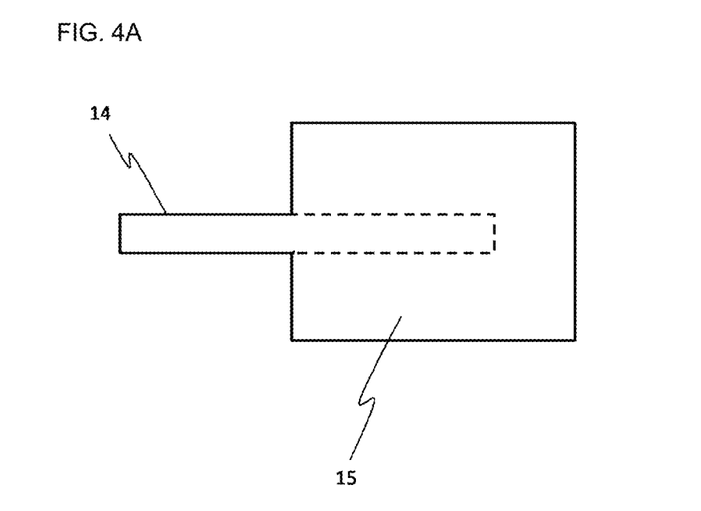
FIG. 4A shows lead wire (tungsten) 14 embedded in sintered compact (tungsten) 15.
Figure 4B:
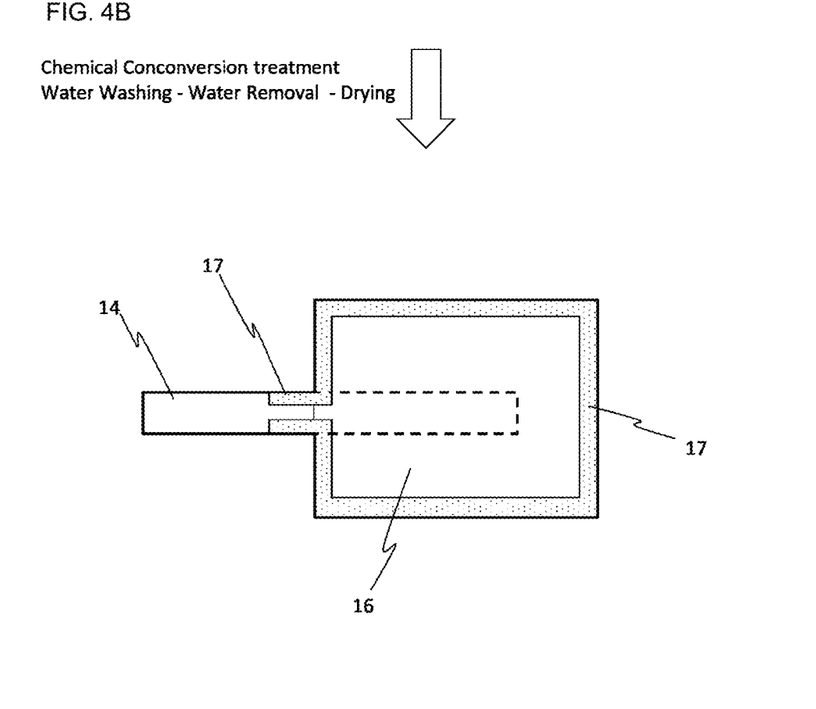
FIG. 4B shows the step of chemical conversion treatment including water washing, water removal and drying so as to form dielectric layer (tungsten oxide) 17 on the surface of anode body (tungsten, sintered compact) 16.
Figure 4C:
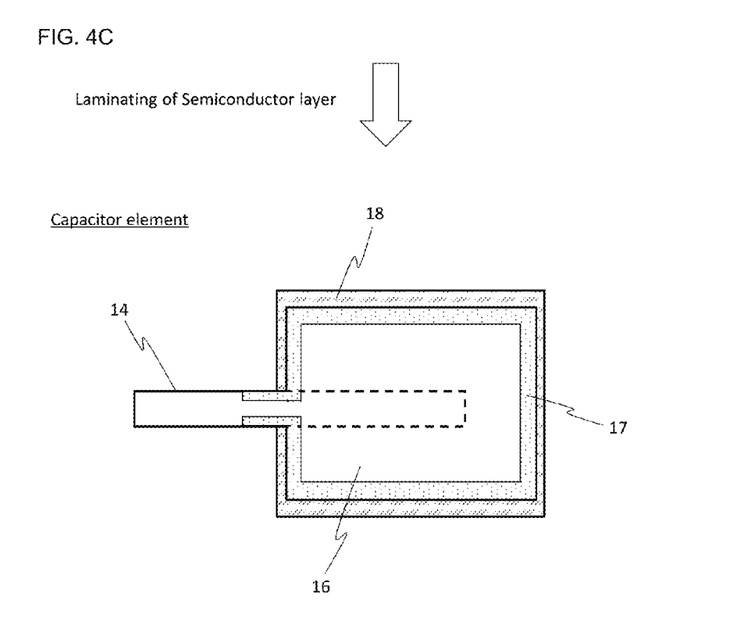
FIG. 4C shows the step of laminating cathode (semiconductor layer) 18 on the dielectric layer 17.
Figure 4D:
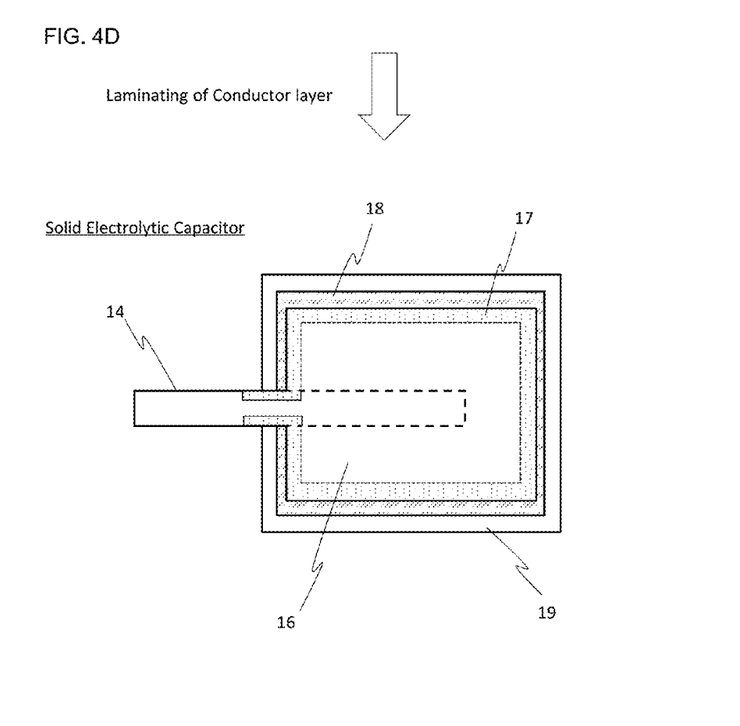
FIG. 4D shows the step of laminating a conductor layer 19 on the cathode 18 so as to form the solid electrolytic capacitor.

Solid electrolytic capacitor elements were obtained in the same manner as in Example 1, except that the chemical conversion liquids used in the chemical conversion treatment and the second chemical conversion treatment were changed to aqueous solutions of the recipes shown in Table 1. The surface of the dielectric layers produced in Examples 2 to 8 was smooth, without sharp projections, salient striae, or cracks. The surface of the dielectric layer produced in Comparative Example 1 had pleat-like projections, as shown in FIG. 3. The 120-Hz capacitance, 10-kHz capacitance, and leakage current of these elements were measured, and their average values were calculated. Table 1 shows the results.

Examples 9 to 16, and Comparative Example 2

Solid electrolytic capacitor elements were obtained in the same manner as in Example 1, except that the chemical conversion liquids used in the chemical conversion treatment and the second chemical conversion treatment were changed to ammonium persulfate aqueous solutions of the recipes shown in Table 1, the temperature of the chemical conversion liquids was changed to 55±2° C., the time of 10-V constant voltage was changed to 5 hours, and drying after the sintered compact was pulled out of the ethanol was performed at 105° C. for 5 minutes, and further at 190° C. for 20 minutes. The surface of the dielectric layers produced in Examples 9 to 16 was smooth, without sharp projections, salient striae, or cracks.

The surface of the dielectric layers produced in Comparative Example 2 had pleat-like projections, as shown in FIG. 3. The 120-Hz capacitance, 10-kHz capacitance, and leakage current of these elements were measured, and their average values were calculated. Table 1 shows the results.

Examples 17 to 24, and Comparative Example 3

Solid electrolytic capacitor elements were obtained in the same manner as in Example 1, except that the chemical conversion liquids used in the chemical conversion treatment and the second chemical conversion treatment were changed to aqueous solutions of the recipes shown in Table 1, the temperature of the chemical conversion liquids was changed to 23±2° C., the time of 10-V constant voltage was changed to 5 hours, and drying after the sintered compact was pulled out of the ethanol was performed at 105° C. for 15 minutes, and further at 225° C. for 15 minutes. The surface of the dielectric layers produced in Examples 17 to 24 was smooth, without sharp projections, salient striae, or cracks.

The surface of the dielectric layers produced in Comparative Example 3 had pleat-like projections, as shown in FIG. 3. The 120-Hz capacitance, 10-kHz capacitance, and leakage current of these elements were measured, and their average values were calculated. Table 1 shows the results.

10-kHz capacitance, and leakage current of these elements were measured, and their average values were calculated. Table 2 shows the results.

Examples 25 and 26, and Comparative Examples 23 and 24

Solid electrolytic capacitor elements were obtained in the same manner as in Examples 11 and 12, and Comparative Examples 6 and 7, except that the chemical conversion liquid used in the second chemical conversion treatment was changed to aqueous solutions of the recipes shown in Table 2. The surface of the dielectric layers produced in Examples 25 and 26 was smooth, without sharp projections, salient striae, or cracks. The 120-Hz capacitance, 10-kHz capaci-

TABLE 1

| | Chemical conversion treatment Chemical conversion liquid | | Second chemical conversion treatment Chemical conversion liquid | | 120-Hz capacitance [μF] | 10-kHz capacitance [μF] | Capacitance ratio (C@10 kHz)/ (C@120 Hz) [%] | Leakage current [μA] |
|---|---|---|---|---|---|---|---|---|
| | Electrolyte or oxidant | Content [mass %] | Electrolyte or oxidant | Content [mass %] | | | | |
| Ex. 1 | $CH_3C(=O)OOH$ | 0.05 | $CH_3C(=O)OOH$ | 0.05 | 378 | 266 | 70.4 | 32.5 |
| Ex. 2 | $CH_3C(=O)OOH$ | 1.0 | $CH_3C(=O)OOH$ | 1.0 | 386 | 290 | 75.1 | 31.3 |
| Ex. 3 | $CH_3C(=O)OOH$ | 2.0 | $CH_3C(=O)OOH$ | 2.0 | 379 | 316 | 83.4 | 30.6 |
| Ex. 4 | $CH_3C(=O)OOH$ | 3.0 | $CH_3C(=O)OOH$ | 3.0 | 381 | 310 | 81.4 | 30.8 |
| Ex. 5 | $CH_3C(=O)OOH$ | 4.0 | $CH_3C(=O)OOH$ | 4.0 | 377 | 295 | 78.2 | 31.0 |
| Ex. 6 | $CH_3C(=O)OOH$ | 7.0 | $CH_3C(=O)OOH$ | 7.0 | 376 | 268 | 71.3 | 31.7 |
| Ex. 7 | $CH_3C(=O)OOH$ | 4.0 | $HNO_3$ | 1.0 | 368 | 279 | 75.8 | 32.7 |
| Ex. 8 | $CH_3C(=O)OOH$ | 10.0 | $CH_3C(=O)OOH$ | 10.0 | 366 | 218 | 59.6 | 34.3 |
| Comp. Ex. 1 | $CH_3C(=O)OOH$ | 0.03 | $CH_3C(=O)OOH$ | 0.03 | 387 | 145 | 37.5 | 33.6 |
| Ex. 9 | $(NH_4)_2S_2O_8$ | 0.05 | $(NH_4)_2S_2O_8$ | 0.05 | 370 | 269 | 72.7 | 31.4 |
| Ex. 10 | $(NH_4)_2S_2O_8$ | 1.0 | $(NH_4)_2S_2O_8$ | 1.0 | 359 | 284 | 79.1 | 30.6 |
| Ex. 11 | $(NH_4)_2S_2O_8$ | 2.0 | $(NH_4)_2S_2O_8$ | 2.0 | 368 | 313 | 85.1 | 29.6 |
| Ex. 12 | $(NH_4)_2S_2O_8$ | 3.0 | $(NH_4)_2S_2O_8$ | 3.0 | 361 | 296 | 82.0 | 28.5 |
| Ex. 13 | $(NH_4)_2S_2O_8$ | 4.0 | $(NH_4)_2S_2O_8$ | 4.0 | 363 | 288 | 79.3 | 29.7 |
| Ex. 14 | $(NH_4)_2S_2O_8$ | 6.0 | $(NH_4)_2S_2O_8$ | 6.0 | 360 | 261 | 72.5 | 29.2 |
| Ex. 15 | $(NH_4)_2S_2O_8$ | 4.9 | $(NH_4)_2S_2O_8$ | 4.9 | 357 | 273 | 76.5 | 30.6 |
| Ex. 16 | $(NH_4)_2S_2O_8$ | 10.0 | $(NH_4)_2S_2O_8$ | 10.0 | 353 | 218 | 61.8 | 42.9 |
| Comp. Ex. 2 | $(NH_4)_2S_2O_8$ | 0.03 | $(NH_4)_2S_2O_8$ | 0.03 | 372 | 136 | 36.6 | 31.7 |
| Ex. 17 | $K_2S_2O_8$ | 0.05 | $K_2S_2O_8$ | 0.05 | 366 | 264 | 72.1 | 30.8 |
| Ex. 18 | $K_2S_2O_8$ | 1.0 | $K_2S_2O_8$ | 1.0 | 373 | 295 | 79.1 | 31.4 |
| Ex. 19 | $K_2S_2O_8$ | 2.0 | $K_2S_2O_8$ | 2.0 | 372 | 316 | 84.9 | 30.0 |
| Ex. 20 | $K_2S_2O_8$ | 3.0 | $K_2S_2O_8$ | 3.0 | 364 | 304 | 83.5 | 29.3 |
| Ex. 21 | $K_2S_2O_8$ | 4.0 | $K_2S_2O_8$ | 4.0 | 375 | 297 | 79.2 | 29.0 |
| Ex. 22 | $K_2S_2O_8$ | 7.0 | $K_2S_2O_8$ | 7.0 | 365 | 266 | 72.9 | 30.4 |
| Ex. 23 | $K_2S_2O_8$ | 4.9 | $HNO_3$ | 2.0 | 354 | 269 | 76.0 | 32.9 |
| Ex. 24 | $K_2S_2O_8$ | 12.0 | $K_2S_2O_8$ | 12.0 | 350 | 220 | 62.9 | 32.7 |
| Comp. Ex. 3 | $K_2S_2O_8$ | 0.03 | $K_2S_2O_8$ | 0.03 | 383 | 138 | 36.0 | 33.6 |

Comparative Examples 4 to 22

Solid electrolytic capacitor elements were obtained in the same manner as in Example 1, except that the chemical conversion liquids used in the chemical conversion treatment and the second chemical conversion treatment were changed to aqueous solutions of the recipes shown in Table 2, the temperature of the chemical conversion liquids was changed to 23±2° C., the time of 10-V constant voltage was changed to 5 hours, and drying after the sintered compact was pulled out of the ethanol was performed at 105° C. for 15 minutes, and further at 225° C. for 15 minutes.

The surface of the dielectric layers produced in Comparative Examples 4 to 12 and 22 had pleat-like projections, as shown in FIG. 3. The surface of the dielectric layers produced in Comparative Examples 13 to 21 had cracks and irregularities, as shown in FIG. 2. The 120-Hz capacitance, tance, and leakage current of these elements were measured, and their average values were calculated. Table 2 shows the results.

The surface of the dielectric layers produced in Comparative Examples 23 and 24 had pleat-like projections, as shown ink FIG. 3. The 120-Hz capacitance, 10-kHz capacitance, and leakage current of these elements were measured, and their average values were calculated. Table 2 shows the results.

Example 27 and Comparative Example 25

Solid electrolytic capacitor elements were obtained in the same manner as in Examples 10 and Comparative Example 14, except that the temperature of the chemical conversion liquid during the second chemical conversion treatment was changed to 45° C. The surface of the dielectric layers produced in Example 27 was smooth, without sharp projections, salient striae, or cracks.

The surface of the dielectric layers produced in Comparative Example 25 had cracks and irregularities, as shown in FIG. 2. The 120-Hz capacitance, 10-kHz capacitance, and leakage current of these elements were measured, and their average values were calculated. Table 2 shows the results.

Example 28 and Comparative Example 26

Solid electrolytic capacitor elements were obtained in the same manner as in Example 20 and Comparative Example 7, except that silicon was not added in the production of granulated powder. The surface of the dielectric layers produced in Example 28 was smooth, without sharp projections, salient striae, or cracks.

The surface of the dielectric layers produced in Comparative Example 26 had pleat-like projections, as shown ink FIG. 3. The 120-Hz capacitance, 10-kHz capacitance, and leakage current of these elements were measured, and their average values were calculated. Table 2 shows the results.

Examples 29 to 31

Chemical conversion treatment was performed in the same manner as in Examples 3, 11, and 19, except that drying was performed without removing water with ethanol, while water remained in the pores, etc. Most of the obtained dielectric layers had a bluish-black smooth surface; however, 31 to 67 dielectric layers of the 128 dielectric layers were deteriorated, and the color of their outer surface was grayish-black. When the leakage current of the sintered compact having a grayish dielectric layer was measured in a 30% by mass sulfuric acid aqueous solution under conditions of room temperature, 2.5 V, and 30 seconds using the lead wire as positive electrode, and a platinum black plate placed in the liquid as negative electrode, the leakage current exceeded 100 μA.

When the leakage current of the sintered compact having a bluish dielectric layer was measured in a 30% by mass sulfuric acid aqueous solution under conditions of room temperature, 2.5 V, and 30 seconds using the lead wire as positive electrode, and a platinum black plate placed in the liquid as negative electrode, the leakage current was 1 μA or less. The 120-Hz capacitance, 10-kHz capacitance, and leakage current of these sintered compacts were measured, and their average values were calculated. Table 2 shows the results.

Example 32

Solid electrolytic capacitor elements were obtained in the same manner as in Example 1, except that drying was not performed after the water removal. The surface of the dielectric layers produced in Example 32 was smooth, without sharp projections, salient striae, or cracks. The 120-Hz capacitance, 10-kHz capacitance, and leakage current were measured. In 18 of 100 solid electrolytic capacitor elements, the 120-Hz capacitance was lower by around 10%, and the 10-kHz capacitance was lower by around 15%. The average capacitance and average leakage current of the remaining 82 solid electrolytic capacitor elements were calculated. Table 2 shows the results.

Example 33

Solid electrolytic capacitor elements were obtained in the same manner as in Example 1, except that the temperature of drying after the water removal was changed to 260° C. The surface of the dielectric layers produced in Example 33 was smooth, without sharp projections, salient striae, or cracks. The 120-Hz capacitance, 10-kHz capacitance, and leakage current were measured. Of 100 solid electrolytic capacitor elements, 25 elements were abnormal elements that had large leakage current, and had a 120-Hz capacitance exceeding 1 mF. The average capacitance and average leakage current of the remaining 75 solid electrolytic capacitor elements were calculated. Table 2 shows the results.

Comparative Example 27

Chemical conversion treatment was tried to be performed in the same manner as in Example 10, except that the temperature of the chemical conversion liquid in the chemical conversion treatment was changed to 65±2° C.; however, the voltage did not reach 10 V. The surface of the dielectric layers produced in Comparative Example 27 had cracks and irregularities, as shown in FIG. 2.

Comparative Example 28

Solid electrolytic capacitor elements were produced in the same manner as in Comparative Example 8, except that the electrolyte of the second chemical conversion was changed to ammonium persulfate in Comparative Example 5. The surface of the dielectric layers produced in Comparative Example 28 had pleat-like projections, as shown in FIG. 3. The average capacitance and average leakage current of these solid electrolytic capacitor elements were calculated. Table 2 shows the results.

TABLE 2

| | Chemical conversion treatment Chemical conversion liquid | | Second chemical conversion treatment Chemical conversion liquid | | 120-Hz capacitance [μF] | 10-kHz capacitance [μF] | Capacitance ratio (C@10 kHz)/ (C@120 Hz) [%] | Leakage current [μA] |
|---|---|---|---|---|---|---|---|---|
| | Electrolyte or oxidant | Content [mass %] | Electrolyte or oxidant | Content [mass %] | | | | |
| Ex. 25 | $(NH_4)_2S_2O_8$ | 2.0 | $(NH_4)_2S_2O_8$ | 3.0 | 370 | 298 | 80.5 | 30.1 |
| Ex. 26 | $(NH_4)_2S_2O_8$ | 3.0 | $(NH_4)_2S_2O_8$ | 1.0 | 365 | 307 | 84.1 | 28.4 |
| Ex. 27 | $(NH_4)_2S_2O_8$ | 1.0 | $(NH_4)_2S_2O_8$ | 1.0 | 346 | 269 | 77.8 | 19.3 |
| Ex. 28 | $K_2S_2O_8$ | 3.0 | $K_2S_2O_8$ | 3.0 | 372 | 293 | 78.8 | 98.3 |
| Comp. Ex. 4 | $HNO_3$ | 0.05 | $HNO_3$ | 0.05 | 380 | 145 | 38.2 | 30.6 |
| Comp. Ex. 5 | $HNO_3$ | 1.0 | $HNO_3$ | 1.0 | 373 | 152 | 40.8 | 34.7 |
| Comp. Ex. 6 | $HNO_3$ | 2.0 | $HNO_3$ | 2.0 | 372 | 146 | 39.2 | 33.9 |
| Comp. Ex. 7 | $HNO_3$ | 3.0 | $HNO_3$ | 3.0 | 368 | 137 | 37.2 | 32.4 |

TABLE 2-continued

| | Chemical conversion treatment Chemical conversion liquid | | Second chemical conversion treatment Chemical conversion liquid | | 120-Hz capacitance [μF] | 10-kHz capacitance [μF] | Capacitance ratio (C@10 kHz)/ (C@120 Hz) [%] | Leakage current [μA] |
|---|---|---|---|---|---|---|---|---|
| | Electrolyte or oxidant | Content [mass %] | Electrolyte or oxidant | Content [mass %] | | | | |
| Comp. Ex. 8 | $HNO_3$ | 4.0 | $HNO_3$ | 4.0 | 369 | 148 | 40.1 | 36.8 |
| Comp. Ex. 9 | $HNO_3$ | 7.0 | $HNO_3$ | 7.0 | 365 | 140 | 38.4 | 33.5 |
| Comp. Ex. 10 | $HNO_3$ | 4.9 | $HNO_3$ | 1.0 | 357 | 139 | 38.9 | 35.0 |
| Comp. Ex. 11 | $HNO_3$ | 0.03 | $HNO_3$ | 0.03 | 384 | 138 | 35.9 | 36.3 |
| Comp. Ex. 12 | $HNO_3$ | 10.0 | $HNO_3$ | 10.0 | 351 | 130 | 37.0 | 36.9 |
| Comp. Ex. 13 | $H_3PO_4$ | 0.05 | $H_3PO_4$ | 0.05 | — | — | — | short |
| Comp. Ex. 14 | $H_3PO_4$ | 1.0 | $H_3PO_4$ | 1.0 | — | — | — | short |
| Comp. Ex. 15 | $H_3PO_4$ | 2.0 | $H_3PO_4$ | 2.0 | — | — | — | short |
| Comp. Ex. 16 | $H_3PO_4$ | 3.0 | $H_3PO_4$ | 3.0 | — | — | — | short |
| Comp. Ex. 17 | $H_3PO_4$ | 4.0 | $H_3PO_4$ | 4.0 | — | — | — | short |
| Comp. Ex. 18 | $H_3PO_4$ | 7.0 | $H_3PO_4$ | 7.0 | — | — | — | short |
| Comp. Ex. 19 | $H_3PO_4$ | 4.9 | $H_3PO_4$ | 2.0 | — | — | — | short |
| Comp. Ex. 20 | $H_3PO_4$ | 0.03 | $H_3PO_4$ | 0.03 | — | — | — | short |
| Comp. Ex. 21 | $H_3PO_4$ | 12.0 | $H_3PO_4$ | 12.0 | — | — | — | short |
| Comp. Ex. 22 | $H_2SO_4$ | 3.0 | $H_2SO_4$ | 3.0 | 368 | 136 | 37.0 | 2208 |
| Comp. Ex. 23 | $HNO_3$ | 2.0 | $HNO_3$ | 3.0 | 362 | 147 | 40.6 | 32.8 |
| Comp. Ex. 24 | $HNO_3$ | 3.0 | $HNO_3$ | 1.0 | 359 | 140 | 39.0 | 31.5 |
| Comp. Ex. 25 | $H_3PO_4$ | 1.0 | $H_3PO_4$ | 1.0 | — | — | — | short |
| Comp. Ex. 26 | $HNO_3$ | 3.0 | $HNO_3$ | 3.0 | 360 | 127 | 35.3 | 104.6 |
| Ex. 29 | $CH_3C(=O)OOH$ | 2.0 | $CH_3C(=O)OOH$ | 2.0 | 382 | 311 | 81.8 | 31.6 |
| Ex. 30 | $(NH_4)_2S_2O_8$ | 2.0 | $(NH_4)_2S_2O_8$ | 2.0 | 365 | 302 | 82.7 | 31.3 |
| Ex. 31 | $K_2S_2O_8$ | 2.0 | $K_2S_2O_8$ | 2.0 | 369 | 308 | 83.5 | 32.7 |
| Ex. 32 | $CH_3C(=O)OOH$ | 0.05 | $CH_3C(=O)OOH$ | 0.05 | 358 | 251 | 70.1 | 33.1 |
| Ex. 33 | $CH_3C(=O)OOH$ | 0.05 | $CH_3C(=O)OOH$ | 0.05 | 368 | 258 | 70.1 | 34.5 |
| Comp. Ex. 28 | $HNO_3$ | 1.0 | $HNO_3$ | 1.0 | 370 | 151 | 40.8 | 34.7 |

As shown in Tables 1 and 2, the solid electrolytic capacitor elements produced by the production method of the present invention (Examples) have a dielectric layer with a smooth surface. Moreover, the capacitor elements of the present invention having a dielectric layer with a smooth surface have a high capacitance in a high frequency range and less leakage current.

In contrast, the solid electrolytic capacitor elements produced by the conventional method (Comparative Examples) had a low capacitance in a high frequency range and large leakage current; thus, they were not suitable for practical use.

EXPLANATION OF SYMBOLS

1: Anode body (tungsten powder)
2: Dielectric layer (layer of tungsten oxide)
5, 12: Pores
7: Surface of dielectric layer
13: Clod
3: Pleat-like projection

The invention claimed is:

1. A capacitor element comprising
an anode body composed of a tungsten sintered compact;
a dielectric layer formed by chemical conversion of the surface of the anode body; and
a semiconductor layer laminated on the dielectric layer;
wherein the capacitor element has a capacitance at 10-kHz that is 55% or more of the capacitance of the capacitor element at 120-Hz.

2. A solid electrolytic capacitor comprising the capacitor element according to claim 1.

3. The capacitor element according to claim 1, wherein the dielectric layer has a smooth surface.

4. A solid electrolytic capacitor comprising the capacitor element according to claim 3.

5. A method for producing a capacitor element,
the capacitor element comprising an anode body composed of a tungsten sintered compact, a dielectric layer having a smooth surface formed by chemical conversion of the surface of the anode body, and a semiconductor layer laminated on the dielectric layer,
in which the method comprises
chemically converting the surface of the sintered compact made of a tungsten powder into the dielectric layer in an aqueous solution containing 0.05 to 12% by mass of an oxidant composed of an oxygen-containing compound at a solution temperature of 62° C. or less.

6. The production method according to claim 5, wherein the oxidant is at least one selected from the group consisting of manganese(VII) compounds, chromium(VI) compounds, halogen acid compounds, persulfuric acid compounds, and organic peroxides.

7. The production method according to claim 5, further comprising, after the chemical conversion, removing water adhering to the surface of the sintered compact at a temperature of less than the boiling point of water, followed by drying at a temperature of not less than the boiling point of water.

8. The production method according to claim 7, wherein the water removal is performed by contact with a solvent that is miscible with water.

9. The production method according to claim 8, wherein the solvent miscible with water is at least one selected from acetic acid, acetone, acetonitrile, dimethylformamide, dimethylsulfoxide, dioxane, propanol, ethanol, methanol, and tetrahydrofuran.

10. The production method according to claim 7, wherein the drying is performed first at a temperature of not less than 105° C. and less than 160° C., and then at a temperature of not less than 160° C. and not more than 230° C.

11. The production method according to claim 5, further comprising, after the chemical conversion, removing water permeating into pores of the sintered compact at a temperature of less than the boiling point of water, followed by drying at a temperature of not less than the boiling point of water.

12. A method for producing a capacitor element,
the capacitor element comprising an anode body composed of a tungsten sintered compact, a dielectric layer formed by chemical conversion of the surface of the anode body, and a semiconductor layer laminated on the dielectric layer;
wherein the capacitor element has a capacitance at 10-kHz that is 55% or more of the capacitance of the capacitor element at 120-Hz,
in which the method comprises
chemically converting the surface of the sintered compact made of a tungsten powder into the dielectric layer in an aqueous solution containing 0.05 to 12% by mass of an oxidant composed of an oxygen-containing compound at a solution temperature of 62° C. or less.

13. The production method according to claim 12, wherein the oxidant is at least one selected from the group consisting of manganese(VII) compounds, chromium(VI) compounds, halogen acid compounds, persulfuric acid compounds, and organic peroxides.

14. The production method according to claim 12, further comprising, after the chemical conversion, removing water adhering to the surface of the sintered compact at a temperature of less than the boiling point of water, followed by drying at a temperature of not less than the boiling point of water.

15. The production method according to claim 14, wherein the water removal is performed by contact with a solvent that is miscible with water.

16. The production method according to claim 15, wherein the solvent miscible with water is at least one selected from acetic acid, acetone, acetonitrile, dimethylformamide, dimethylsulfoxide, dioxane, propanol, ethanol, methanol, and tetrahydrofuran.

17. The production method according to claim 14, wherein the drying is performed first at a temperature of not less than 105° C. and less than 160° C., and then at a temperature of not less than 160° C. and not more than 230° C.

18. The production method according to claim 12, further comprising, after the chemical conversion, removing water permeating into pores of the sintered compact at a temperature of less than the boiling point of water, followed by drying at a temperature of not less than the boiling point of water.

* * * * *